United States Patent
Kohn

(10) Patent No.: US 10,454,230 B2
(45) Date of Patent: Oct. 22, 2019

(54) FLEXIBLE ELECTRICAL COUPLING MEMBER AND SET OF ELECTRONIC DEVICES INTERCONNECTED BY SUCH A MEMBER

(71) Applicant: SAGEMCOM BROADBAND SAS, Rueil Malmaison (FR)

(72) Inventor: Stephane Kohn, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 15/769,497

(22) PCT Filed: Oct. 3, 2016

(86) PCT No.: PCT/EP2016/073583
§ 371 (c)(1),
(2) Date: Apr. 19, 2018

(87) PCT Pub. No.: WO2017/076559
PCT Pub. Date: May 11, 2017

(65) Prior Publication Data
US 2018/0309251 A1    Oct. 25, 2018

(30) Foreign Application Priority Data
Nov. 6, 2015   (FR) ..................... 15 60670

(51) Int. Cl.
*H01R 13/56* (2006.01)
*H01R 31/00* (2006.01)
(Continued)

(52) U.S. Cl.
CPC ........... *H01R 31/005* (2013.01); *H01R 11/01* (2013.01); *H02G 3/0462* (2013.01); *H02G 11/00* (2013.01); *H01R 13/562* (2013.01)

(58) Field of Classification Search
CPC .... H01R 31/005; H01R 4/185; H01R 25/006; H01R 13/73; H01R 13/652; H01R 13/514; H01R 11/01; H01R 12/592; H01R 25/16
(Continued)

(56) References Cited

U.S. PATENT DOCUMENTS

| 5,092,786 | A | * | 3/1992 | Juhlin | ................ | H01R 25/162 |
| | | | | | | 439/215 |
| 5,158,472 | A | * | 10/1992 | Juhlin | ................ | H01R 25/162 |
| | | | | | | 439/215 |

(Continued)

FOREIGN PATENT DOCUMENTS

DE   20 2014 101359 U1   4/2014
WO   WO 2015/080028 A1   6/2015

*Primary Examiner* — Jean F Duverne
(74) *Attorney, Agent, or Firm* — Muncy, Geissler, Olds & Lowe, P.C.

(57) ABSTRACT

Electrical coupling member, including electrical conductors extending in a casing which has end segments that are generally parallelepipedal in cross-section and each have at least one main face. The conductors have ends coupled to two external connectors which both project from one of the main faces and are both guided out of the casing on the same side of said casing. The casing including at least one flexible intermediate segment freely receiving an overlength of the electrical conductors. Set of superposed electronic devices coupled by a coupling member of this type.

9 Claims, 1 Drawing Sheet

(51) Int. Cl.
*H02G 3/04* (2006.01)
*H02G 11/00* (2006.01)
*H01R 11/01* (2006.01)

(58) Field of Classification Search
USPC .......................................... 439/447
See application file for complete search history.

(56) References Cited

U.S. PATENT DOCUMENTS

| | | | | |
|---|---|---|---|---|
| 5,186,640 | A * | 2/1993 | McCoy | H01R 25/162 439/211 |
| 5,785,542 | A * | 7/1998 | Johnson | H01R 25/162 439/210 |
| 7,114,972 | B1 * | 10/2006 | Riner | H01R 13/73 439/215 |
| 7,294,005 | B1 * | 11/2007 | Laukhuf | H01R 13/514 439/215 |
| 7,520,762 | B2 * | 4/2009 | Lehman | F21V 21/35 439/115 |
| 7,955,106 | B1 | 6/2011 | Crow et al. | |
| 2002/0137381 | A1 * | 9/2002 | Chapman | H01R 13/639 439/215 |
| 2004/0102072 | A1 * | 5/2004 | Plattner | H01R 13/514 439/215 |
| 2005/0091797 | A1 | 5/2005 | Dillingham | |
| 2005/0130476 | A1 * | 6/2005 | Kochanski | H01R 25/16 439/215 |
| 2006/0052009 | A1 * | 3/2006 | Johnson | H01R 12/592 439/660 |
| 2008/0045060 | A1 * | 2/2008 | Knepper | H01R 13/73 439/215 |
| 2008/0102673 | A1 * | 5/2008 | Riner | H01R 13/582 439/215 |
| 2008/0293276 | A1 * | 11/2008 | Riner | H01R 13/73 439/215 |
| 2009/0221169 | A1 * | 9/2009 | Byrne | H01R 13/652 439/211 |
| 2009/0239403 | A1 * | 9/2009 | Byrne | H01R 25/162 439/215 |
| 2010/0184316 | A1 * | 7/2010 | Byrne | H01R 25/006 439/215 |
| 2010/0190369 | A1 * | 7/2010 | Byrne | H01R 4/185 439/215 |

* cited by examiner

FLEXIBLE ELECTRICAL COUPLING MEMBER AND SET OF ELECTRONIC DEVICES INTERCONNECTED BY SUCH A MEMBER

The present invention relates to electrical connection, and more particularly to electrically connecting pieces of electronic equipment together.

STATE OF THE ART

Homes nowadays contain a large number of pieces of electronic equipment, in particular for multimedia broadcasting and telecommunications. These pieces of electronic equipment often occupy space in the living room and, by way of example, they may comprise an Internet gateway, a television decoder (for terrestrial or satellite digital television), a hard disk recorder, . . . . These pieces of equipment are generally grouped together in at least two boxes that are ideally of the same dimensions and capable of being placed one on another in order to be as discreet as possible.

In order to be able to operate, it is necessary for the pieces of equipment to be electrically connected to one another. For this purpose, electric cables are used that are connected to external connection ports generally arranged at the backs of the boxes so as to be out of sight for users. Nevertheless, it often happens that at least some of the cables protrude sideways from the boxes, thereby spoiling the appearance of the set. Specifically, it is impossible to have cables of the exact length needed, since any small offset of the pieces of electronic equipment would lead to the cables, and thus the external connection ports, being subjected to tension.

OBJECT OF THE INVENTION

An object of the invention is to remedy that drawback, at least in part.

BRIEF SUMMARY OF THE INVENTION

To this end, the invention provides an electrical connection member comprising electrical conductors extending in a sheath having end segments of generally rectangular cross-section, each having at least one main face. The conductors have ends connected to two external connectors, each projecting from one of the main faces, being oriented towards the outside of the sheath and on the same side thereof. The sheath comprises at least one flexible intermediate segment freely receiving extra lengths of the electrical conductors.

The term "extra lengths" is used herein to mean that the electrical conductors are of lengths that are longer than the spacing between the external connectors when the sheath is in a rest state, i.e. when the sheath is neither stretched nor compressed. Thus, the flexibility of the sheath and the extra lengths of the electrical conductors enable the connection member to adapt to offsets in relative positioning between the pieces of electronic equipment, preferably with respect to three directions and three rotations, without exerting tension on the connections. Furthermore, as a result of its shape, the connection member can be pressed against the pieces of electronic equipment.

The invention also provides a set of at least two pieces of electronic equipment placed one on another and electrically connected together by at least one electrical connection member of the invention. The electrical connection member is pressed against the pieces of electronic equipment.

Other characteristics and advantages of the invention appear on reading the following description of particular, non-limiting embodiments of the invention.

BRIEF DESCRIPTION OF THE FIGURES

Reference is made to the accompanying drawing, in which.

DETAILED DESCRIPTION OF THE INVENTION

Figure 1:
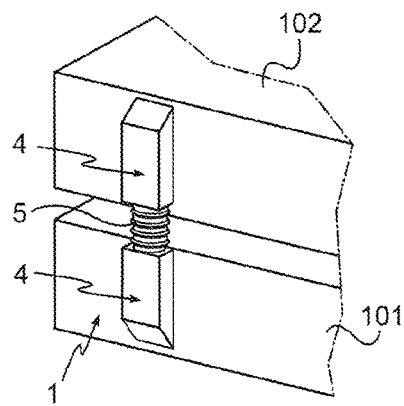
FIG. 1 is a fragmentary diagrammatic perspective view of a set of pieces of electronic equipment of the invention.

With reference to the figures, the electrical connection member of the invention, given overall reference 1, comprises electrical conductors 2 that extend in a sheath 3 of central axis X.

The sheath 3 has end segments, given general reference 4, at opposite ends of a flexible intermediate segment, given general reference 5. Each of the end segments 4 has a cross-section that is generally rectangular in shape and it comprises main faces 4.1, 4.2 of length extending parallel to the axis X. The end face 4.1 is shorter than the end face 4.2 and is connected thereto via a chamfer 4.3 remote from the intermediate segment 5.

An external connector 6 is fastened to project from each main face 4.2, specifically a standard universal serial bus (USB) type 3.0 connector for one of the end segments 4 and a connector of mini-USB 3.0 type for the other end segment 4. The external connectors 6 point outwards from the sheath 3 on the same side thereof, and each has a portion penetrating into the sheath 3 in order to be connected to the electrical conductors 2 at a respective one of their two ends.

Figure 2:
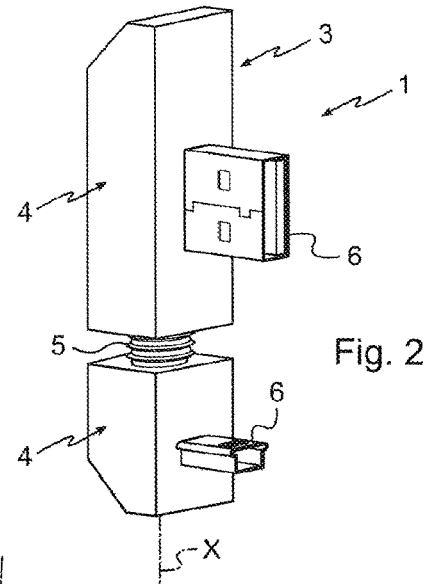
FIG. 2 is a diagrammatic perspective view of a connection member in a first embodiment.
Figure 3:
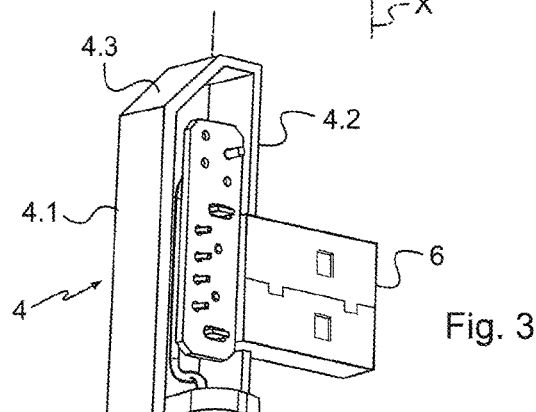
FIG. 3 is a diagrammatic perspective view of the same connection member, during assembly.

With reference more particularly to FIGS. 1 to 3, in the first embodiment, each of the two end segments 4 in this example is formed by two half-shells that are closed onto the external connector 6 and onto a respective end of the intermediate segment 5.

The flexible intermediate segment 5 is of a tubular bellows shape of circular cross-section that is smaller than the cross-sections of the end segments 4. The flexible intermediate segment 5 has its ends provided with respective collars that serve to hold the ends of the flexible intermediate segment 5 in the end segments 4.

The flexible intermediate segment 5 freely receives extra lengths of the electrical conductors 2. More precisely, in this example, the electrical conductors 2 extend freely all along the sheath 3 to the external connectors 6. The electrical conductors are thus of lengths that are longer than the spacing between the external connectors when the sheath is in a rest state, i.e. when the sheath is not stretched.

In this example, the end segments 4 are made of rigid plastics material and the intermediate segment 5 is made of elastomer. In a variant, the end segments 4 could also be made of flexible plastics material, such as an elastomer.

FIG. 1 shows a set of at least two pieces of electronic equipment 101, 102 that are placed one on another and that are electrically connected together by an electrical connection member 1 such as the member described above. The end segments 4 of the electrical connection member 1 have their respective main faces 4.2 pressed against the pieces of electronic equipment 101, 102.

Figure 4:
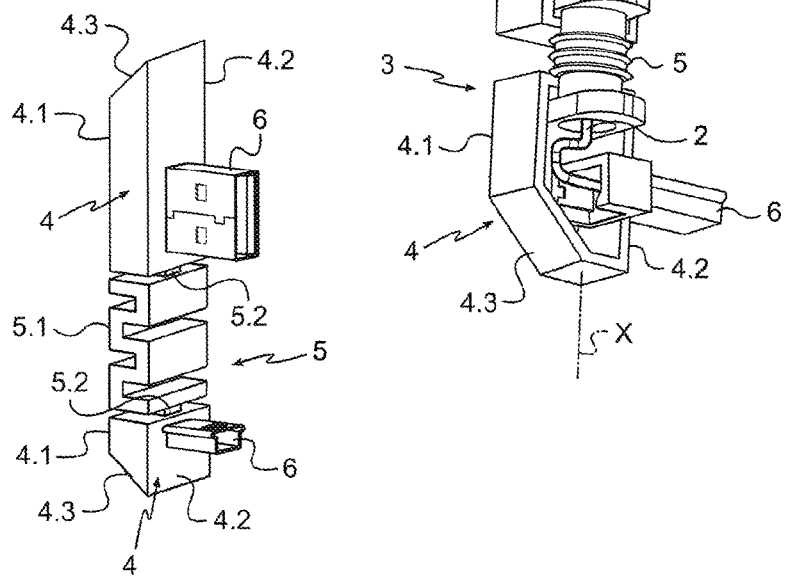
FIG. 4 is a diagrammatic perspective view of a connection member in a second embodiment.

With reference to FIG. 4, and in the second embodiment, the flexible intermediate segment 5 comprises a central portion 5.1 of a shape that undulates along a longitudinal direction (axis X) of the sheath 3. The central portion 5.1 is attached to each end segment 4 by a portion 5.2 of reduced cross-section. It can be understood that the undulating shape of the central portion provides the flexible intermediate segment 5 with flexibility essentially in traction and in compression along the axis X and in bending about an axis perpendicular to the axis X and parallel to the main faces 4.2, and that the portions 5.2 of reduced cross-section provide the flexible intermediate segment 5 with flexibility essentially in bending about an axis perpendicular to the main faces 4.2.

The electrical conductors 2 extend along the flexible intermediate segment 5 by following the undulations.

The flexible intermediate segment 5 is generally flat, i.e. the smallest dimension of the flexible intermediate segment 5 (its thickness) is measured perpendicularly to the main faces 4.1 and 4.2.

Figure 5:
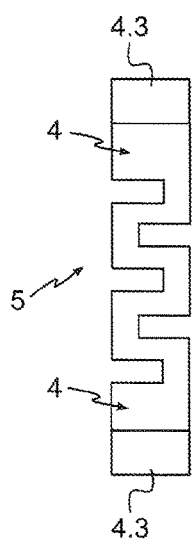
FIG. 5 is a cutaway diagrammatic perspective view of a connection member in a third embodiment.

With reference to FIG. 5, and in the third embodiment, the flexible intermediate segment 5 is of reduced cross-section and it extends along a zigzag shape between the end segments 4. The zigzag shape is generally flat, i.e. the smallest dimension of the zigzag shape (its thickness) is measured perpendicularly to the main faces 4.1, 4.2. More precisely, the flexible intermediate segment 5 forms a succession of square bends alternating between one direction and than the other. In a variant, the bends could be triangular or rounded.

The electrical conductors 2 extend along the flexible intermediate segment 5 following its zigzag shape.

This zigzag shape provides the flexible intermediate segment 5 with flexibility essentially in traction and compression along the axis X, in bending about an axis perpendicular to the axis X and parallel to the main faces 4.2, and in bending about an axis perpendicular to the main faces 4.2.

Naturally, the invention is not limited to the embodiments described but covers any variant coming within the ambit of the invention as defined by the claims.

In particular, the flexible intermediate segment may be of a shape that is different, e.g. having a different number of portions of reduced cross-section. The undulations may be square, sinusoidal, or of some other shape.

The invention claimed is:

1. An electrical connection member comprising electrical conductors extending in a sheath having end segments of generally rectangular cross-section, each having at least one main face, the conductors having ends connected to two external connectors, each projecting from one of the main faces, being oriented towards the outside of the sheath and on the same side thereof, the sheath comprising at least one flexible intermediate segment freely receiving extra lengths of the electrical conductors.

2. The connection member according to claim 1, wherein the conductors are arranged freely all along the sheath and as far as the connectors.

3. The connection member according to claim 1, wherein the flexible intermediate segment is bellows shaped.

4. The connection member according to claim 3, wherein the flexible intermediate segment has a cross-section that is circular.

5. The connection member according to claim 1, wherein the flexible intermediate segment is of undulating shape along a longitudinal direction of the sheath.

6. The connection member according to claim 1, wherein the flexible intermediate segment has at least one portion of reduced cross-section.

7. The connection member according to claim 1, wherein at least the flexible intermediate segment is made of elastomer.

8. The connection member according to claim 1, wherein the flexible intermediate segment has its smallest dimension measured perpendicularly to the main faces.

9. A set of at least two pieces of electronic equipment placed one on another and electrically connected together by at least one electrical connection member in accordance with claim 1 and pressed against the pieces of electronic equipment.

* * * * *